United States Patent [19]

Diggs

[11] 4,039,847
[45] Aug. 2, 1977

[54] TIDEWATER POWER PLANT

[76] Inventor: Richard E. Diggs, S. 12A Road, P.O. Box 776, Carthage, Mo. 64836

[21] Appl. No.: 624,226

[22] Filed: Oct. 20, 1975

[51] Int. Cl.² .......................................... F03B 13/12
[52] U.S. Cl. .................................... 290/42; 290/53
[58] Field of Search ..................... 290/42, 43, 53, 54

[56] References Cited
U.S. PATENT DOCUMENTS

| 1,263,865 | 4/1918 | Dale | 290/54 X |
| 2,820,148 | 1/1958 | Southwick | 290/42 X |
| 3,426,540 | 2/1969 | Fixel | 290/42 X |

Primary Examiner—Robert K. Schaefer
Assistant Examiner—W. E. Duncanson, Jr.
Attorney, Agent, or Firm—Shoemaker and Mattare, Ltd.

[57] ABSTRACT

A device and method of converting tidal currents into power. The device comprises a plurality of modules and is mounted in tidal water so that one face is presented inland and the opposite face is presented seaward. Each module comprises a turbine mounted on an elevator means which moves the turbine vertically in response to water level changes during a tide. The modules are alternately presented toward the inland and seaward directions thereby permitting tidal water movement associated with both flood and ebb tides to be converted into power. Apparatus for sensing the amount of water flowing over the turbine for controlling the movement of the elevator device, and apparatus for withdrawing power from the device are also disclosed.

11 Claims, 7 Drawing Figures

TIDEWATER POWER PLANT

BACKGROUND OF THE INVENTION

The present invention relates to prime movers, and, more particularly, to a prime mover which converts tidal currents into power.

Ocean tides cause the displacement of millions of tons of water each day. As is well known, movement of water can be converted into usable power, and thus, tidal currents represent a vast source of power.

Devices are known which convert tidal currents into power. These devices usually comprise a turbine positioned so that water moving in response to the tide impacts the turbine to turn it. The turbine rotation is then translated into electric power.

As used herein, an overflow turbine is one in which the turbine wheel is turned in response to fluid flowing over the top of a turbine, and an underflow turbine is one in which the wheel is turned in response to fluid flowing underneath the turbine.

If the turbine is an overflow type, the turbines of known devices are fixed to a support, and the device forms a wall which must be very high to be profitable. Such high walls are expensive to manufacture and erect, are subject to damage from ocean storms, unduly disrupt normal ocean movements, detract from the esthetics normally associated with tidal waters or the like.

Other devices place the turbine on a floating platform which follows the movement of the water as it rises and falls.

However, the floating devices are susceptible to damage and/or breakup due to wind forces or high wave conditions. Furthermore, because the platform must float on the surface, the turbine must be an underflow type. Thus, water can only flow underneath the turbine to impulse it and the turbine is less efficient then the overflow type. Thus, devices using floating platforms must also be quite large to be profitable.

Furthermore, most known devices are unitary, that is formed of a single wall or supporting structure. Thus, each device must be specially made for a particular application. This customizing represents a costly process which essentially eliminates any possibility of mass producing the devices or their component parts.

The present invention is modular and converts tidal currents into electric power using a vertically movable overflow type turbine.

SUMMARY OF THE INVENTION

A device embodying the present invention profitably and efficiently converts tidal currents into power without requiring a large, or high, supporting structure.

The device comprises a plurality of supporting piers located in tidal water. The piers form a plurality of tide gates, which together, form an elongated wall with one face presented inland and the opposite face presented seaward. The modules each comprise an elevator means connected to the piers and a turbine mounted on the elevator means so that it is vertically movable from a position beneath the top of the wall to a position adjacent the top of the wall. The turbine is an overflow type and is connected to a generator for converting turbine wheel rotation into electricity. Some of the turbines are connected to the supporting structure to be presented in the inland direction, and some are connected to the supporting structure to be presented in the seaward direction.

The turbines have water-depth sensing means located on top thereof and which are operatively connected to the elevator means to actuate that elevator means when the water flowing over the turbines reaches a prescribed depth. Once actuated, the elevator means moves the turbine to another vertical position whereat the water flows thereover without swamping the turbine. Thus, during flood tide, the inland facing turbines are progressively raised to be operated by the tidal current, and during ebb tide, the seaward facing turbine are progressively lowered to be operated by tidal currents.

The device comprises a plurality of modules which can be ganged together to be positioned across any size estuary, inlet, or cover any suitable length of beach, or to otherwise be of any suitable length. Furthermore, the modules can be arranged to assume a curved configuration. Being modular, the component parts can be mass produced and shipped to various locations for use thereat.

Thus, the device embodying the present invention can utilize an efficient overflow turbine without requiring high supporting structures as the turbine can move between a location near the bottom of the pier to a location near the top thereof, thus utilizing substantially the entire height of the wall during a tide. The device of the present invention therefore requires supporting structures which are substantially lower than the supporting structures of known devices. Obviously, smaller supporting structures reduces the overall cost of the device, which again increases the profitability thereof.

The device of the present invention therefore profitably produces power using units that have a differential height, that is, the difference in height between water on one side of the device and the height of the water on the other side of the device during the tide, of between 4 and 6 feet. This height differential is compared to the 20 to 30 feet height differential required for known devices.

Being modular, a plurality of modules can be quickly erected in a variety of forms, and the entire device need not be shutdown to service some parts thereof. The modular concept is contrasted to the unitary structures of known devices which are slowly and expensively erected and must be entirely shutdown to service parts thereof.

Because of the turbines are vertically movable, they can be moved into a low, or unobtrusive, orientation during tidal stand to partially restore the esthetics of the tidal water.

Due to the low differential required to make the present device profitable, it does not require the great quantities of expensive material required by devices which must withstand differentials of 20 to 30 feet.

OBJECTS OF THE INVENTION

It is therefore a main object of the present invention to profitably convert tidal current into electric energy.

Another object of the present invention is to convert tidal current during both flood tide and ebb tide into electric current.

It is a specific object of the present invention to provide a device with vertically movable turbines to convert tidal current into electric energy.

It is another specific object of the present invention to provide a modular device for converting tidal currents into usable power.

These together with other objects and advantages which will become subsequently apparent reside in the details of construction and operation as more fully hereinafter described and claimed, reference being had to the accompanying drawings forming part hereof, wherein like numerals refer to like parts throughout.

BRIEF DESCRIPTION OF THE DRAWINGS

FIG. 7 is a block diagram of the control system used in accordance with the teachings of the present invention.

DETAILED DESCRIPTION OF THE PREFERRED EMBODIMENT

Figure 1:
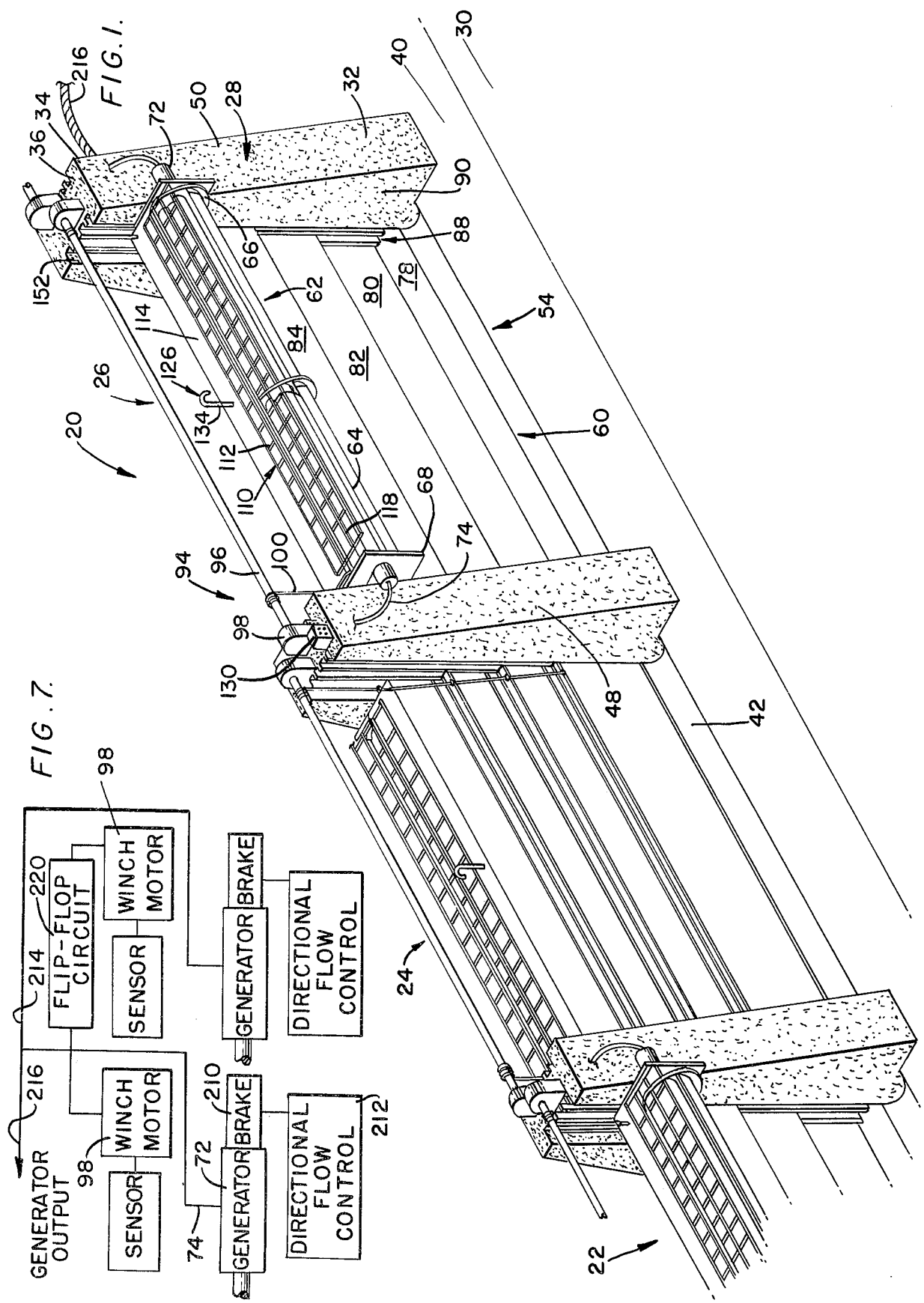
FIG. 1 is a perspective view of the device embodying the teachings of the present invention.

Shown in FIG. 1 is a device 20 for converting tidal currents into electric power and comprises a plurality of modules, such as modules 22, 24 and 26 shown. A plurality of supporting piers 28 are embedded in a sea or river bottom 30 and may be constructed of reinforced concrete, such as shown in FIG. 1. The piers are pyramidlike with wide bases 32 and cross sections which taper to a narrow top 34 to form the truncated shape shown in FIG. 1 with top surface 36. The piers comprise a heavy-duty footing 40 which has defined therein a trash basin 42 for catching and retaining debris which may contact the device. The trash basin is periodically cleaned out as required to maintain free movement of the turbines to be later described.

Figure 4:
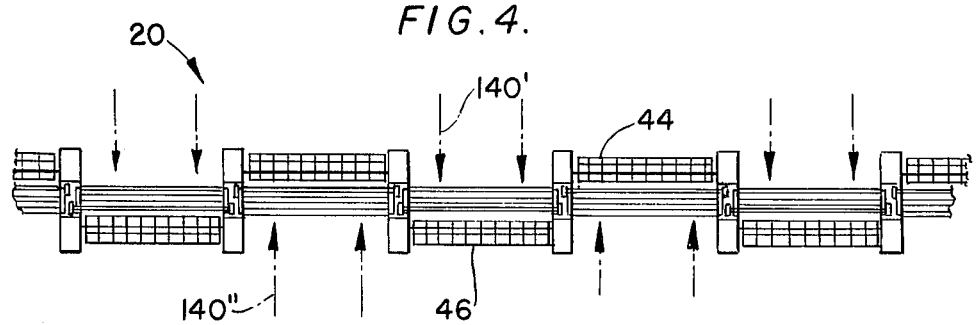
FIG. 4 is a plan view of the device constructed in accordance with the teachings of the present invention.

As shown in FIGS. 1 and 4, the device 20 is located in tidal waters and at a position subject to strong tidal currents. The device is elongated and forms a wall-like structure with one face oriented seaward and the other face oriented inland. Thus, for example as shown in FIG. 4, face 44 can be oriented inland, and face 46 can be oriented seaward. Therefore, the device 20 is operative during both flood tide and ebb tide.

As shown in FIG. 1, two adjacent supporting piers such as piers 48 and 50 form a tide gate 54.

Telescopingy connected to piers 48 and 50 and extending across tide gate 54 is an elevator means 60 having mounted thereon an overflow turbine 62. The turbine 62 comprises a turbine wheel 64 formed of a plurality of turbine blades connected to end discs 66, which are mounted on turbine housing end plates 68. Generators 72 having output cables 74 connected thereto are mounted on the outside of turbine end plates 68. The output cables 74 are shown broken away and are connected to suitable means for utilizing the electric power generated by the generators in response to turbine wheel rotation.

The elevator means 60 comprises a plurality of elevator leaves 78 through 84 which are slidably mounted in elevator guide means 88 located on the inside surface 90 of the supporting piers. Elevator hoisting means, such as windlass 94 comprising a bar 96 mounted to a motor 98 located on top surface 26 of the piers. Elevator cables 100 are wound around bar 96 and are attached to elevator leaves 78 through 84 for raising and lowering those leaves between predetermined vertical positions with respect to the supporting piers. The turbine is mounted on elevator leaf 84 and is therefore vertically movable along with that leaf.

The turbine assumes vertical positions on the piers so that water passing thereover will turn the turbine wheel 64 and water on the other side of the turbine will not swamp it.

Therefore, with reference to FIG. 4, tidal current passing over face 44 drives turbine 62 by flowing thereover and collecting on the side to which face 46 is presented. As the water located on the downstream side, in this case that side adjacent face 46, builds up, or increases in depth, it would swamp turbine 62 after only a very short period of operation of that turbine. However, by raising the turbine 62 upwardly, it is maintained above the surface of the water located adjacent face 46 and is therefore prevented from being swamped. The turbine can be raised as the water adjacent face 44, i.e. the upstream water, is constantly increasing in depth as the tide progresses.

As shown in FIG. 1, the turbine 62 is vertically movable between a position adjacent pier bottom 32 to a position adjacent pier top 34. However, the vertical positions of the turbine can be chosen according to the predicted depth of the tides during the tidal cycle. Thus, the top position of the turbine can be selected so that tidal currents during high spring tide can be accommodated, and the bottom position of the turbine can be selected so that tidal currents during low neap tide can be accommodated. Furthermore, the overall height of the piers is selected to maintain the electrical equipment dry even during the highest spring flood tide. If the device is to be used in tidal waters subject to very high tides, more elevator leaves can be added to the four shown in FIG. 1.

Mounted on top of the turbine 62 is a debris guard 110 comprising a grating formed of a plurality of spaced apart bars 112 oriented with their longitudinal axis in the flow direction and having one end connected to a bar supporting means 114 (FIG. 3) which is mounted on elevator leaf 84 at the top surface 116 thereof. Transverse bars 118 are mounted to the turbine end plates 68 and support the other end of the bars 112. The bar supporting means 114 extends outwardly from the elevator leaf 84 and comprises a curved end 120 which serves as a water guide for guiding water onto turbine blades 64 while debris remains on top of the debris guard 110. Eventually debris is forced off of the debris guard and falls downwardly past the turbine without contacting the turbine blades.

A water sensor 126 is mounted on surface 116 of the elevator leaf 84 and is connected by a line to a control means 130 located on the pier top surface 36. The water sensor acts as a depth detector to keep exactly the optimum amount of water flowing over the turbine. The optimum amount of water is determined by the rate of flow in the tidal current, the tide raising rate, or the like, so that the turbine is moved by the windlass 94 in response to signals from the control means 130 to maintain the optimum amount of water flowing over the turbine. When the tide is completed, the turbine will have moved into the appropriate position. Thus, during flood tide, a turbine is moved from the bottom position upwardly to the top position, and during ebb tide, an oppositely facing unit moved downwardly as the tide recedes while maintaining the first unit in its upright top position to seal it against leakage or flow in a reverse direction.

The water sensor 126 is shown to be a U-shaped tube, and comprises appropriate water sensing devices. The length of a supporting leg 134 determines the depth of water passing over the turbine 62.

It is noted that once the tide is completed, the turbines can be reset into their appropriate positions during tidal stand. Furthermore, all of the materials should be anti-corroding, and the electrical components encased in water-tight housings. Furthermore, the preferred embodiment comprises one turbine per module, however more turbines could be used.

Figure 2:
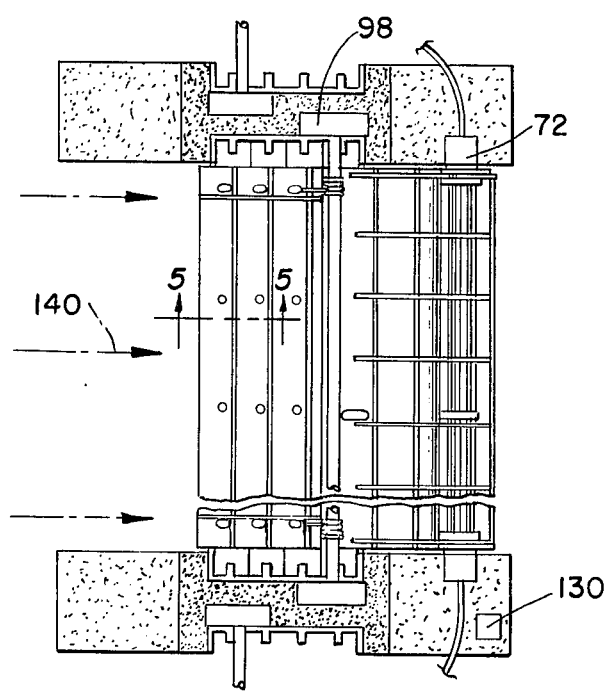
FIG. 2 is a plan view of a module in accordance with the teachings of the present invention.

FIG. 2 shows a top view of a module with water flowing thereover in a direction indicated by arrows 140. The module shown in FIG. 2 is representative of the module shown in FIG. 4. Therefore, the flow direction can be, for example, that shown by arrows 140' during ebb tide if face 44 is presented inland or that flow direction shown by arrows 140'' during flood tide if face 46 is presented seaward. Therefore, alternate modules are utilized to convert tidal currents into electric power during both ebb tide and flood tide. The device 20 is more efficient and hence more profitable, then those devices which utilize tidal currents from only one tide, be it either ebb tide or flood tide.

Figure 3:
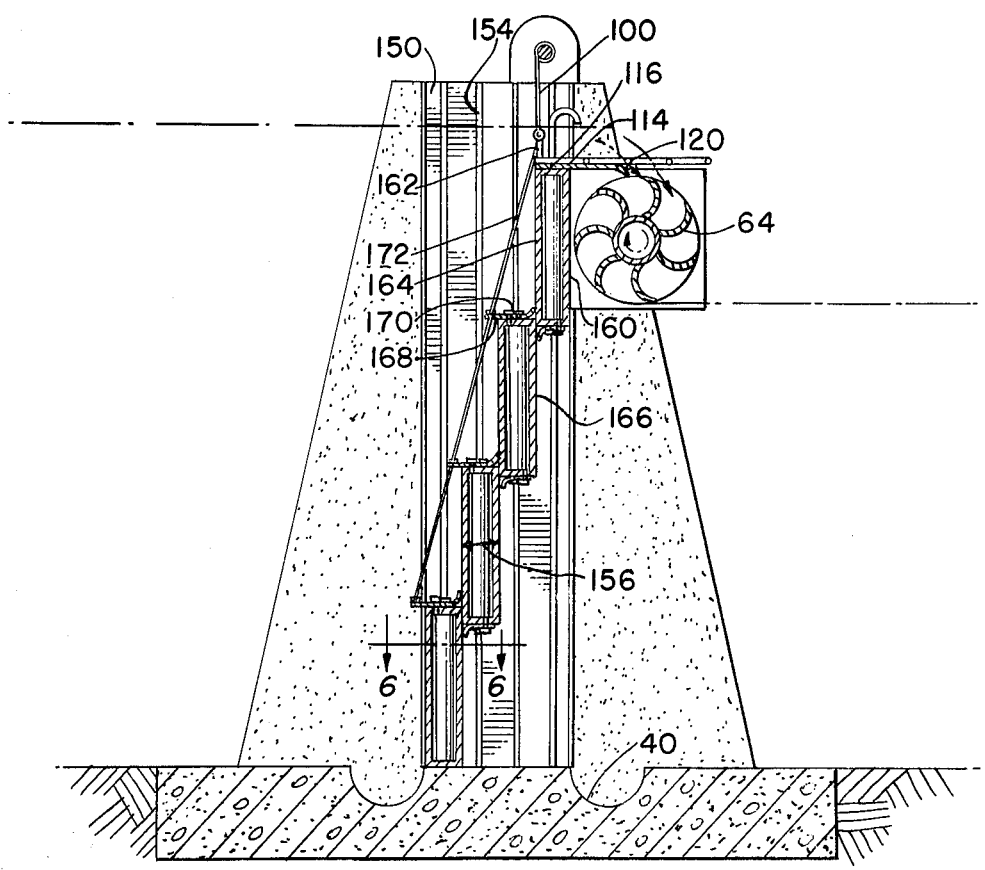
FIG. 3 is an end elevation view of the module shown in FIG. 2.

The elevator means 60 and its associated guide means 88 is best shown in FIG. 3. The guide means 88 is comprised of an insert 150 positioned in channel 152 (FIG. 1) on the inside surface 90 of the piers. The guide means 88 comprises a plurality of ribs 154 which act as leaf guides and are spaced apart a distance sufficient to enable leaves 78 through 84 to telescope under the influence of gravity and collapse to place turbine 62 in the bottom position. Therefore, as shown in FIG. 3, each elevator leaf has an outer width indicated by line 156 on leaf 80, and the spacing between the ribs 154 corresponds to this width. Top leaf 84 has turbine 62 mounted on the front face 160 thereof, and lifting bolt 162 on the top surface 116 thereof. The cable 100 is attached to the lifting bolt 162. The rear surface 164 of the leaf 84 slidingly engages front face 166 of leaf 82, and leaf 82 has cable guide 168 on the top surface 170 thereof. Cable 172 fits through cable guides 168 and is connected to top leaf 84.

Figure 6:
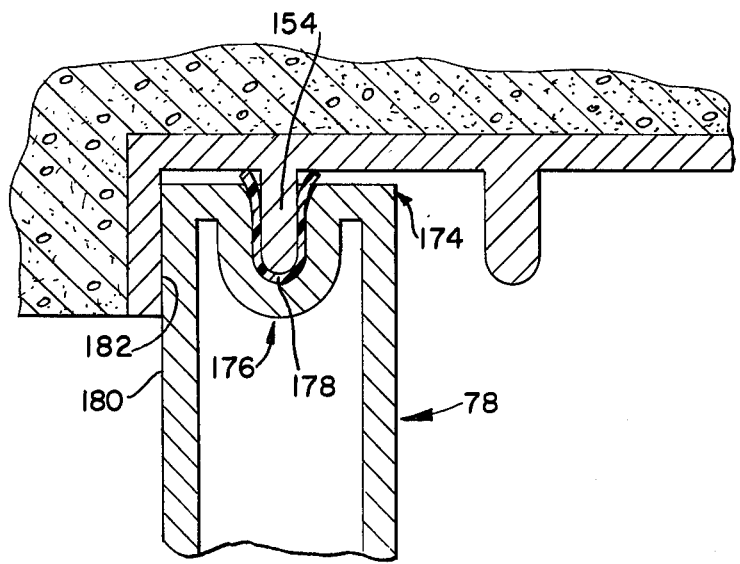
FIG. 6 is a detailed view taken along line 6—6 of FIG. 3.

As shown in FIG. 6, each leaf has a transverse end 174 having defined a guide channel 176 or leaf guide which extends the length of the leaf. The guide channel receives one of the ribs 154 to slidably mount the leaf onto the elevator guide means. A seal 178, which is preferably Teflon, seals the end of the leaf to the leaf guide. FIG. 6 shows lower leaf 78, and therefore, that leaf has a back surface 180 engaging the inner surface 182 of the guide means 88. Top leaf 84 will be similarly engaging inner surface 180 of the guide means 88 with the front face 160 thereof.

Figure 5:
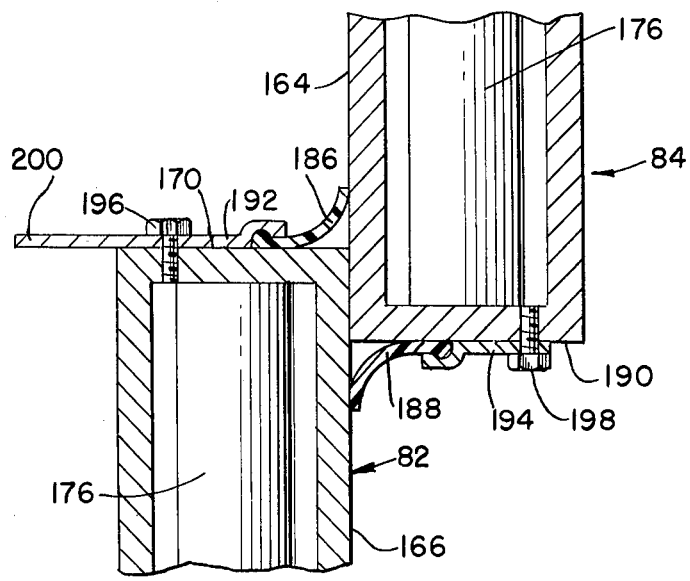
FIG. 5 is a detailed view taken along line 5—5 of FIG. 2.

FIG. 5 shows the engagement between rear surface 164 of top leaf 84 and the front surface 166 of the next lower leaf 82. Seals 186 and 188 engage surfaces 164 and 166, respectively and are retained on top surface 170 of leaf 82 and bottom surface 190 of top leaf 84 by clips 192 and 194, respectively. The clips 192 and 194 are mounted to surfaces 170 and 190 by bolts 196 and 198, respectively. The guide channels 176 are also shown in FIG. 5.

The clip 192 comprises an extension 200 which engages the top of the leaf 80 as leaf 82 moves downwardly in the collapsing process. The cable 172 connects the leaves together so that on the upward motion of leaf 84, the leaves extend into the position shown in FIG. 3, and the extensions 200 mounted on the top of each leaf contacts the top of the next lower leaf so that during the downward motion of leaf 84, the elevator leaves collapse to be co-level in the bottom position with the elevator leaf 84.

The block diagram shown in FIG. 7 is an example of a control system which can be used in conjunction with the device 20. As shown in FIG. 7, the generators have brakes 210 thereon which are connected to directional flow controls 212 for assuring proper movement of the turbine wheel and generator connection. The generator output cable 74 can be commonly connected to a manifoldlike output line 214 which is connected to a device output line 216. A flip-flop circuit 220 controls the winch, or windlass motors 98 so that one unit is deactivated when it reaches its final position, and the next unit is activated to convert tidal current in the next tide into power. Therefore, for example, after a flood tide, those turbines presented inland are in the top position and are deactivated by flip-flop circuit 220 while those turbines facing seaward are activated by that circuit 220 to generator power during the ebb tide. For the sake of clarity, only two circuits are shown in FIG. 7, however, it is understood that there will be enough circuits to control all of the modules.

The generator output can be either AC or DC and it can be appropriate storage and/or transformer units associated therewith to store or transform that output as desired.

The water sensors 126 are connected to the winch motors to turn those motors on or off according to the depth of water flowing over turbine 62. Whether the motor raises or lowers the turbine in response to the signals from the sensor 126 is determined by the signals received thereby from flip-flop circuit 220.

In the preferred embodiment, a differential between the depth of water on the upstream side of the module and the depth of the water on the downstream side of the module is maintained at approximately 6 feet. The elevator means 60 is actuated to raise or lower the turbine when this differential between the upsteam and downstream sides reaches 6 feet. The sensor 126 is oriented on top leaf 84 to maintain this 6 foot differential. The sensor circuit can be programmed to maintain other differentials as well.

Therefore, substantially the entire height of the device 20 can be utilized by an overflow type turbine thereby permitting the device 20 to use a low height differential. Substantially all of the tide can be used to generate power with a short device. Device 20 can therefore profitably produce power using low supporting piers.

An example of the operation of the device embodying the present invention is as follows. A sensor will cause one of the turbines, for example a turbine presented to be operated during a flood tide, so that water begins to flow over that turbine when a height differential of 6 feet is obtained. The sensor will cause the elevator means to move the turbine during the tide so that the 6 foot differential is maintained, at least until the turbine has reached a point where no additional power can be obtained therefrom.

At this last-mentioned point, the turbine is moved all the way to the top, and the next adjacent turbine is actuated. The adjacent turbines are actuated to be lowered during an ebb tide, and the above-described process is repeated, with the differential of 6 feet being maintained until the turbine reaches a lowermost position wherein no further power can be obtained from the module.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within the metes and bounds of the claims or that form their functional as well as conjointly cooperative equivalents, are therefore intended to be embraced by those claims.

What is claimed is:

1. A device for converting tidal current into electrical power comprising:

an upright supporting structure located in a body of water subject to tides, said supporting structure having a structure top, one side presented inland and another side presented seaward so that horizontal water movement associated with said tides causes water to move past said supporting structure;

a turbine wheel having a turbine top and a turbine bottom and mounted on said supporting structure so that water moving past said supporting structure flows over said turbine top to cause rotation thereof, said turbine wheel being mounted on said supporting structure to be vertically movable thereon between a first position located a predetermined distance below said structure top and a second position located adjacent said structure top;

a turbine wheel moving means connected to said supporting structure for vertically moving said turbine wheel in a manner such that said turbine wheel is moved between said first and second positions during said tides so that said turbine moves vertically in cooperation with changes in water level during said tides;

power generating means connected to said turbine wheel for converting turbine wheel rotation into electric power; and power withdrawing means connected to said power generating means for withdrawing electric power therefrom.

2. The device of claim 1 wherein said turbine wheel is mounted on said supporting structure to be presented seaward so that horizontal water movement associated with ebb tides causes water to flow over said turbine wheel to rotate same, and further including another turbine mounted on said supporting structure to be presented inland so that horizontal water movement associated with flood tides causes water to flow over said turbine wheel to rotate said another turbine wheel.

3. The device of claim 2 further including turbine wheel moving means connected to said supporting structure for vertically moving said another turbine wheel in a manner such that said turbine wheel is moved between said first and second positions during said flood tides so that said another turbine moves vertically in cooperation with changes in water level during said flood tides.

4. The device of claim 3 further including further turbine wheels mounted on said supporting structure to form a plurality of modules, said further turbine wheels being mounted on said supporting structure in an alternating arrangement so that some of said further turbine wheels are rotated by horizontal water movement associated with flood tides flowing thereover, and others of said further turbine wheels are rotated by horizontal water movement associated with ebb tides flowing thereover.

5. The device of claim 4 further including a plurality of turbine wheel moving means connected to said supporting structure for vertically moving said further turbine wheels in a manner such that said further turbine wheels are moved between said first and second positions during said tides so that said further turbine wheels move vertically in cooperation with changes in water level during said tides.

6. The device of claim 1 wherein said turbine wheel moving means comprises a plurality of telescoping members each slidably connected to said supporting structure with said turbine wheel being mounted on one of said members, elevating means connected to said supporting structure for telescopingly moving said members, and water sensing means connected to said turbine wheel and to said elevating means for sensing the amount of water flowing over said turbine wheel so that said turbine wheel can be moved in response to changes in water level associated with said tides.

7. The device of claim 6 further including seals attached to each of said telescoping members and slidably contacting an adjacent member.

8. The device of claim 7 further including a debris guard on said turbine wheel.

9. A process for converting tidal current into electrical energy comprising the steps of:

supporting in an alternating manner a plurality of turbines in a body of water which is subject to tides in an orientation so that horizontal water movement associated with an ebb tide causes water to flow over some of said turbines to rotate same and horizontal water movement associated with flood tides causes water to flow over other ones of said turbines to rotate same;

moving said turbines vertically between a first position and a second position during said tides in cooperation with changes in water level during said ebb and flood tides;

converting rotation of said turbines into electrical power; and removing said electrical power from said turbines.

10. The process of claim 9 further including a step of moving said turbines being rotated so that the tops thereof are always located just below the surface of the water located upstream of the turbines.

11. The process of claim 9 further including a step of returning the turbines to said first position during tidal stand.

* * * * *